(No Model.)

L. V. ROUSE.
Potato Digger.

No. 237,410.  Patented Feb. 8, 1881.

Witnesses:

Inventor:

UNITED STATES PATENT OFFICE.

LYMAN V. ROUSE, OF DOWAGIAC, MICHIGAN.

POTATO-DIGGER.

SPECIFICATION forming part of Letters Patent No. 237,410, dated February 8, 1881.

Application filed July 6, 1880. (No model.)

*To all whom it may concern:*

Be it known that I, LYMAN V. ROUSE, of the city of Dowagiac, county of Cass, and State of Michigan, have invented a certain Improvement in Hand Potato-Diggers, of which the following is a specification.

The object of my invention is the construction of a hand potato-digger that can be operated by a man or boy with greater ease and more rapidity than heretofore.

My improvement consists in the use of a fork and lever and having an axle-tree supported at each end by a wheel, having the lever attached to the axle-tree, forming a fulcrum by forcing the fork-tines into the ground and bearing down on the lever, thus lifting the potatoes out of the ground with ease; also, the adjustable joints by means of which the right height of leverage is obtained for a short or tall person.

To enable others skilled in the art to which my invention belongs to make and use it, I will proceed to describe its construction and operation.

Figure 1:
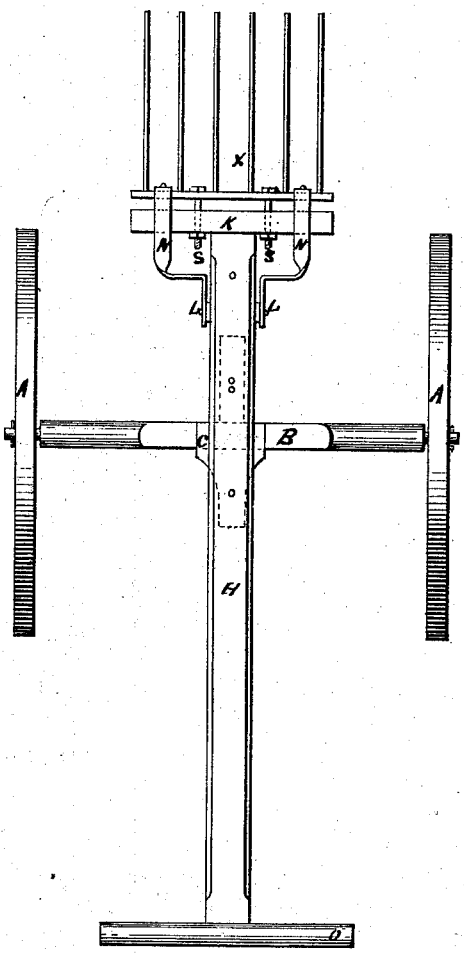
Figure 2:
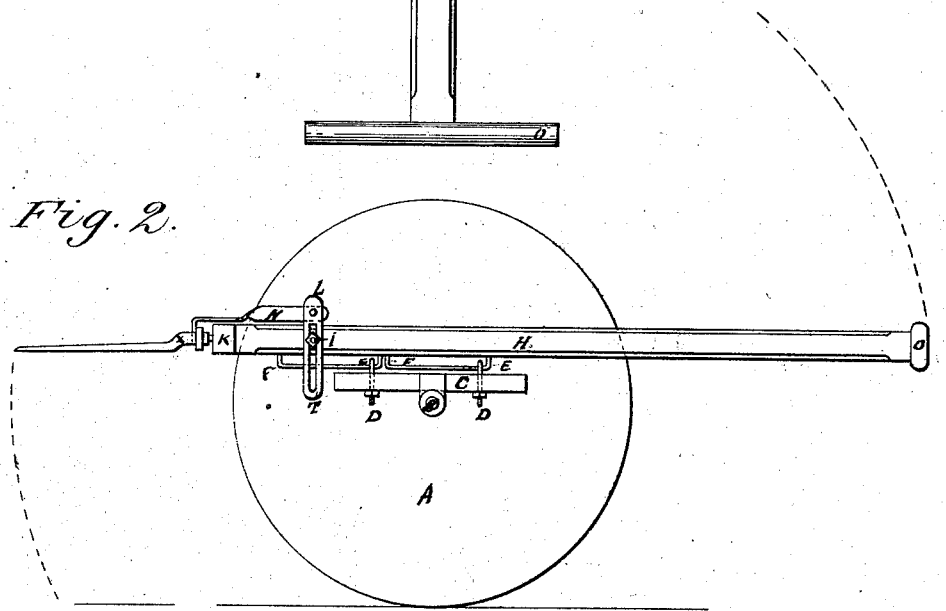

In the accompanying drawings, forming a part of this specification, Figure 1 shows a top view of my invention, and Fig. 2 shows a perspective side view of the same with one wheel detached.

A A represent the wheels. These wheels are about a foot in diameter.

B represents the axle-tree. This is sufficiently long to allow the wheels to travel in the furrows on each side of a potato-hill. Across the center of the axle-tree I attach the saddle C, having bolts D D passing through it, with eyelets E E, through which the staples F F engage and are attached to the lever H, having a tilting-handle, O.

K is the fork-head, and X the tines, adjustable by joints L L, consisting of the lifting-bars N N, slotted bars T T, and bolt $i$. The fork-tines X are riveted to the lifting-bars N N, and are secured to the fork-head K by means of two set-bolts, S S.

This machine is operated by pressing down on the handle O, raising the fork-tines X from the ground, as shown in Fig. 2 by the dotted lines, then pushing forward, causing the wheels A A to move the fork over the hill of potatoes to be dug. Then drawing back on the handle O causes the staples F F to slide through the eyelets E E, the fork to draw back, and the wheels A A to stand still. Then giving a forward shove forces the fork-tines X into the ground under the hill of potatoes. Then bearing down on the handle O, using the axle-tree as a fulcrum, raises the potatoes out of the ground. Then rocking the handle O up and down shakes the dirt from the tines X, and leaves the potatoes on the ground.

In order to maintain the same relative height for a tall or short person of the handle O, I loosen the bolt $i$ passing through the slotted bars T T, and raise the lifting-bars N N, and fasten the bolt $i$, which will raise the handle O for a tall person, and the reverse adjustment will lower it for a short one.

I am aware that potato-diggers have been made with two wheels and an axle, which serves as a fulcrum for a hand potato-fork, secured pivotally thereto, and I do not claim such broadly.

Having thus fully described my invention in the most exact terms that I can give, what I claim as new, and wish to secure by Letters Patent, is—

The combination of the wheels A A, axle-tree B, adjustable joints L L, fork-tines X, lever H, bolts D D, eyelets E E, staples F F, and tilting-handle O, as and for the purposes set forth.

LYMAN V. ROUSE.

Witnesses:
GEORGE B. SULLIVAN,
JOHN F. TRYON.